(12) United States Patent
Mullis (10) Patent No.: US 9,481,060 B2
(45) Date of Patent: Nov. 1, 2016

(54) SHARPENING RADIAL TEETH ON THE SURFACE OF A DISK

(71) Applicant: Thomas Allen Mullis, Monroe, NC (US)

(72) Inventor: Thomas Allen Mullis, Monroe, NC (US)

( * ) Notice: Subject to any disclaimer, the term of this patent is extended or adjusted under 35 U.S.C. 154(b) by 228 days.

(21) Appl. No.: 14/159,930

(22) Filed: Jan. 21, 2014

(65) Prior Publication Data

US 2014/0219738 A1 Aug. 7, 2014

Related U.S. Application Data

(60) Provisional application No. 61/760,687, filed on Feb. 5, 2013.

(51) Int. Cl.
| | |
|---|---|
| *B23F 5/26* | (2006.01) |
| *B23Q 3/04* | (2006.01) |
| *B23C 3/00* | (2006.01) |
| *B23C 5/22* | (2006.01) |
| *B23F 1/06* | (2006.01) |

(52) U.S. Cl.
CPC . *B23Q 3/04* (2013.01); *B23C 3/00* (2013.01); *B23C 5/2226* (2013.01); *B23C 2210/0421* (2013.01); *B23F 1/06* (2013.01); *B23F 5/26* (2013.01); *Y10T 407/1908* (2015.01); *Y10T 409/10795* (2015.01); *Y10T 409/103816* (2015.01); *Y10T 409/103975* (2015.01); *Y10T 409/104134* (2015.01); *Y10T 409/105883* (2015.01); *Y10T 409/106678* (2015.01); *Y10T 409/107155* (2015.01); *Y10T 409/303808* (2015.01); *Y10T 409/305488* (2015.01); *Y10T 409/308792* (2015.01)

(58) Field of Classification Search
CPC .. B23F 1/06; B23F 5/26; Y10T 409/103816; Y10T 409/103975; Y10T 409/104134; Y10T 409/105883; Y10T 409/106519; Y10T 409/106678; Y10T 409/107155; Y10T 409/10795; Y10T 409/308792

See application file for complete search history.

(56) References Cited

U.S. PATENT DOCUMENTS

| | | | |
|---|---|---|---|
| 2,517,873 A | 8/1950 | Harrell | |
| 2,716,908 A | 9/1955 | Lundberg | |
| 2,772,602 A * | 12/1956 | Christman | B23F 19/102 407/21 |
| 3,952,616 A | 4/1976 | Varley | |
| 4,040,313 A | 8/1977 | Lustgraaf | |
| 4,720,220 A * | 1/1988 | Bloch | B23F 21/083 407/118 |
| 4,954,028 A * | 9/1990 | Seroo | B23F 5/02 409/26 |
| 5,244,318 A * | 9/1993 | Arai | B23C 5/2221 407/113 |

(Continued)

*Primary Examiner* — Daniel Howell
*Assistant Examiner* — Yasir Diab
(74) *Attorney, Agent, or Firm* — Hammer & Associates, P.C.

(57) ABSTRACT

A method for sharpening radially extending teeth on a disk included: 1) sharpening a tooth by moving the disk relative to a cutting head, 2) separating the disk from the cutting head, 3) indexing the disk to the next tooth, 4) engaging the cutting head with the next tooth, and repeating steps 1)-4) until sharpening is complete. A machine for sharpening teeth includes: a table movable in the x-y plane, an angle plate mounted on the table for holding a disk, a digital indexer for rotating the disk, a cutting head for sharpening the teeth, and a computer for the controlling the movement of the disk relative to the cutting head by sequentially moving the disk via movement of the table and rotation of the disk on the angle plate. A rotary cutting head has a cutting element affixed at a periphery of the head.

8 Claims, 6 Drawing Sheets

(56) References Cited

U.S. PATENT DOCUMENTS

| | | | |
|---|---|---|---|
| 5,292,212 A * | 3/1994 | Taylor | B23F 21/226 33/501.14 |
| 5,377,454 A | 1/1995 | Pedersen et al. | |
| 5,759,092 A | 6/1998 | Liu | |
| 5,775,180 A | 7/1998 | Parke | |
| 5,791,840 A * | 8/1998 | Sijtstra | B23F 5/04 409/12 |
| 7,156,718 B2 * | 1/2007 | Blasberg | B23F 9/10 451/47 |
| 2003/0219320 A1 * | 11/2003 | Horiike | B23C 5/1045 407/113 |
| 2007/0292220 A1 * | 12/2007 | Sjoberg | B23B 27/1611 407/66 |

* cited by examiner

SHARPENING RADIAL TEETH ON THE SURFACE OF A DISK

RELATED APPLICATION

This application claims the benefit of co-pending U.S. provisional patent application Ser. No. 61/760,687 filed Feb. 5, 2013, incorporated herein by reference.

FIELD OF THE INVENTION

The invention disclosed herein is directed to the sharpening of radially extending teeth on the surface of a disk.

BACKGROUND OF THE INVENTION

Figure 2:
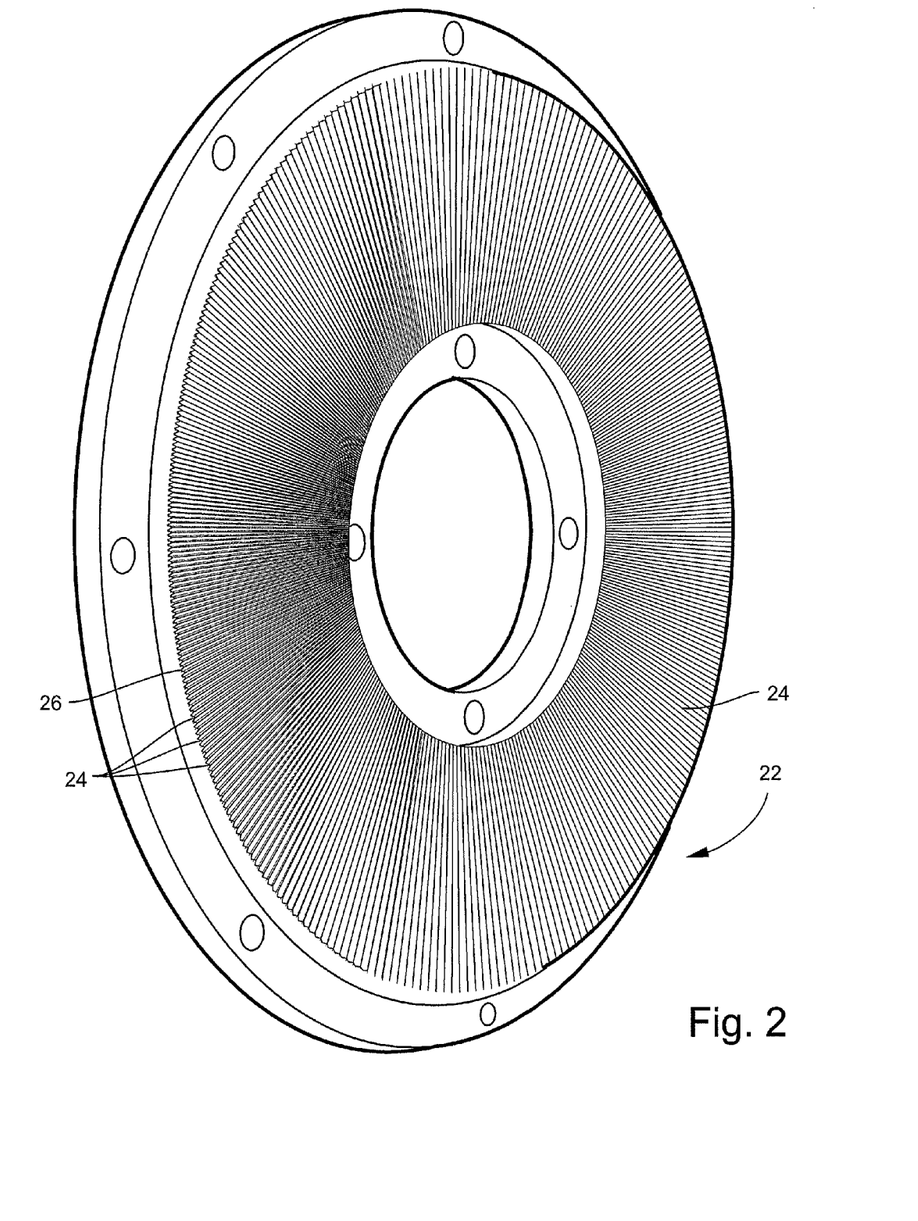
FIG. 2 illustrates a disk having a plurality of radially extending teeth disposed on a surface thereof.

There are several processing machines that use disks having a plurality of radially extending teeth on the surface of the disk, see FIG. 2, to reduce the size of particles. In general, the equipment uses two disks, with the surface having the teeth facing one another, spaced apart, so the teeth do not touch. The material to be reduced in size is fed between the disks as at least one disk rotates relative to the other. Such equipment may include, for example, pulverizers and powder mills. This equipment may be used to reduce the size on any material, such as, but not limited to, flour, wood, plastic resin, and recycled plastic.

During operation, the teeth become dull. With dulling, the efficiency of the equipment's size reduction capacity is diminished. Accordingly, the teeth are periodically sharpened. To date, the teeth sharpening process has been a 'grinding' process. Grinding, as used in the machining arts, refers to an operation using an abrasive wheel. In the grinding process, sharpening is performed by a grinding wheel (typically made with either diamond or poly cubic boron nitride (PCBN)) in a 'wet' process. In the wet process, the coolant, for example, oil (for diamond wheels) or synthetic or semi-synthetic oil (for PCBN wheels), is used to cool the grinding wheel and the teeth, and to remove swarf scraped from the teeth by the grinding wheel. These grinding wheels are expense (costing between $1800-3000) and the grinding machine is expensive (typically about $500,000) too. This process is also time-consuming (typically, depending on the extent of wear, from 2-4 hours per disk). Grinding typically requires 2-4 passes of the grinding wheel per tooth to completely sharpen the tooth and the speed of grinding is typically about 12 inches/minute. All of the foregoing makes the typical cost to sharpen the teeth on a disk, by grinding, about 10% of the cost of a new disk each time it is processed, and the lead time for sharpening can be great.

Accordingly, there is a need for new method to sharpen the radial teeth on the surface of a disk.

SUMMARY OF THE INVENTION

A method for sharpening radially extending teeth on a disk included: 1) sharpening a tooth by moving the disk relative to a cutting head, 2) separating the disk from the cutting head, 3) indexing the disk to the next tooth, 4) engaging the cutting head with the next tooth, and repeating steps 1)-4) until sharpening is complete. A machine for sharpening teeth includes: a table movable in the x-y plane, an angle plate mounted on the table for holding a disk, a digital indexer for rotating the disk, a cutting head for sharpening the teeth, and a computer for the controlling the movement of the disk relative to the cutting head by sequentially moving the disk via movement of the table and rotation of the disk on the angle plate. A rotary cutting head has a cutting element affixed at a periphery of the head.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

To better illustrate the instant invention, there is shown in FIG. 2, the disk 22 with a plurality of radially extending teeth 24 standing up on a surface 26 of the flat metal disk. This disk 22 may be used in, for example, a pulverizer, as discussed above. The disk 22 may also be referred to hereinafter as a work piece.

The invention uses a dry milling operation to sharpen the teeth. Milling, as used in the machining arts, refers to removal of material with a cutting head, e.g., a rotating cutting head, having one or more cutting elements. Dry refers to a process where no coolant is necessary, but it may be used. Milling is different from grinding. Grinding uses an abrasive wheel to remove material.

Figure 1:
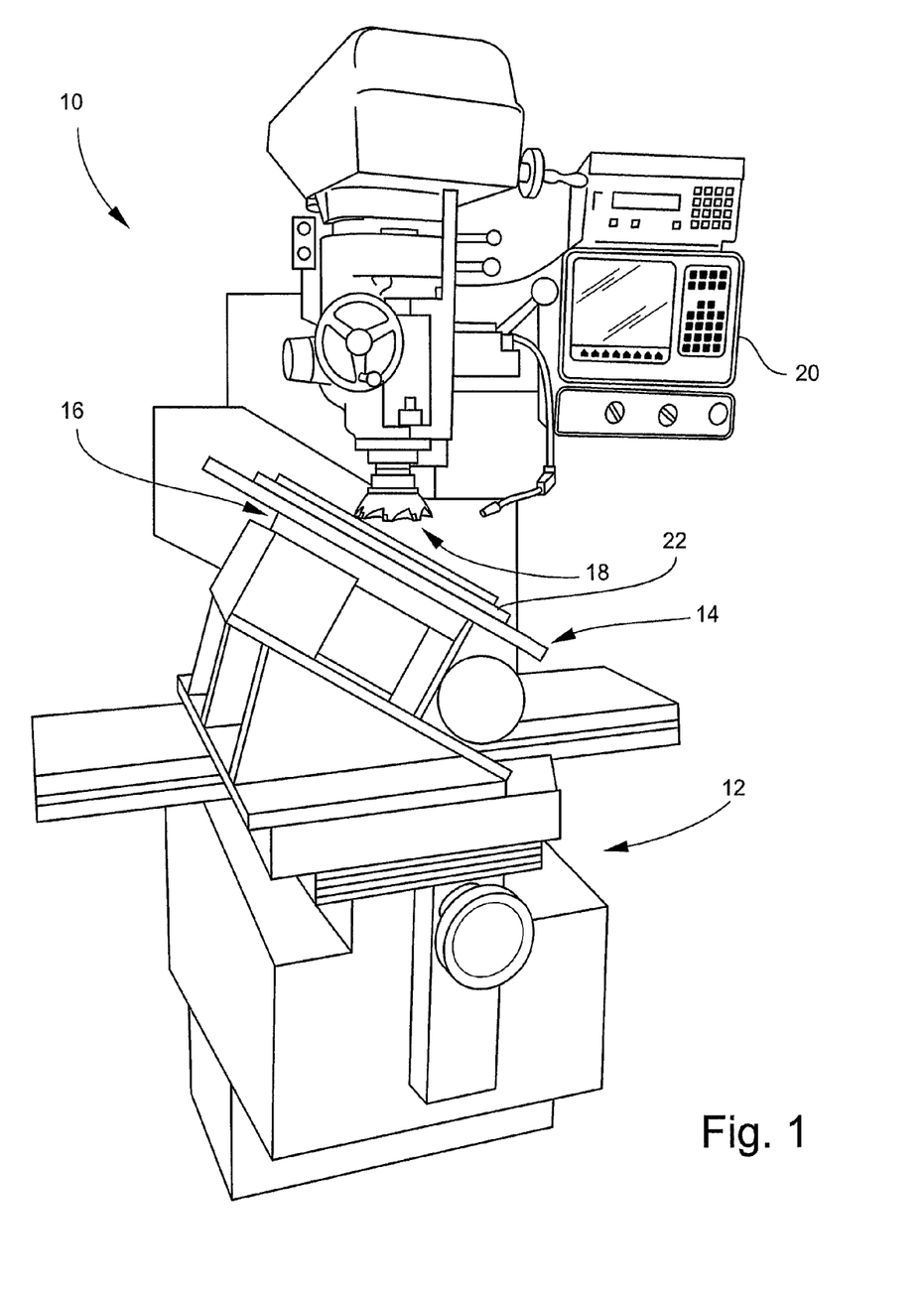
FIG. 1 illustrates an embodiment of the inventive machine.

Referring to the drawings, where like numerals are to like elements, there is shown in FIG. 1 an illustration of the inventive sharpening machine 10.

Machine 10 generally comprises: a table 12 moveable in the x-y plane, an angle plate 14 mounted on table 12, a digital indexer 16 associated with angle plate 14, a cutter head 18 positioned above the angle plate 14, and a computer 20 for controlling the movement of the disk 22 and the cutter head 18. Machine 10 is a milling machine purposed for, among other things, the sharpening the radially extending teeth on the surface of a disk.

The table 12 is adapted to move in the x-y plane, for example a horizontal plane. Movement of the table, in the x-y plane, is controlled by the computer 20. Table 12 is conventional as is the control of its movement by the computer.

The angle plate 14 rides (or is mounted) on table 12 and may be removably affixed thereto. Angle plate 14 is adapted to hold a disk 22. The disk 22 is affixed, in any conventional manner, to the angle plate 14 during the sharpening operation, and removed after sharpening is complete. The angle of the plate 14 to the table 12 is adjustable. The angle may be defined by the cut needed to sharpen a tooth 24 on the disk 22. This angle may be manually set by an operator or may be controlled by the computer 20. Any angle may be possible, from 0°-90°. Typical angles may be in the range of: 15°-75°, or 20°-70°, or 30°-60°, or any subcombination of angles between 0°-90°. The angle of the disk 22 to the cutting head 18 may be at any angle. For example, if the tooth has a cross section of an equilateral triangle (all angles=60°), then the angle of the disk to the cutting head would be 60°.

The digital indexer 16 is associated with angle plate 14. The digital indexer 16 is adapted to rotate disk 22 from one tooth 24 to next tooth 24 during the sharpening operation. The degree of rotation is controlled by computer 20 and may vary from disk to disk depending upon the number of teeth on the disk. The digital indexer is conventional.

The cutter head 18 is positioned above the angle plate 14. Cutter head 18 is a rotary cutting head. The cutting head 18 may be rotated at any speed. In one embodiment, the rotating speed of the cutting head may be in the range of 200-2000 rpm. Rotating speed will depend on several factors, including, but not limited to: cutter head diameter, surface speed (feet per minute) relative to the outside diameter of the cutter head, material being cut, depth of cut. Cutter head 18 is in a fixed position in relationship to the x-y (i.e., horizontal) plane but may be movable in the z direction (i.e., vertical direction). Disk 22 is moved passed the cutter head 18 by operation of the table 12 and digital indexer 16, both being controlled by computer 20 as will be discussed in greater detail below, and at a given angle, as defined by the angle plate 14.

Figure 3:
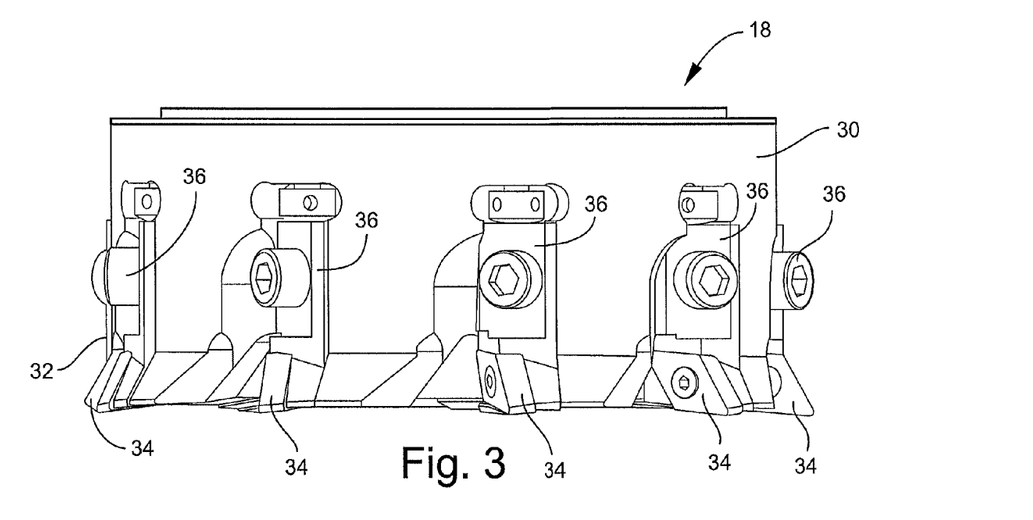
FIG. 3 is an illustration of a cutting head used in the inventive machine/process.

One embodiment of the cutter head 18 is illustrated in FIG. 3. The cutting head 18 uses at least one cutting element 34 set to make the cut. Cutting (or milling) is accomplished by rotating the head 18 and engaging the cutting element 34 with the work piece (or tooth face on the disk). Generally, cutter head 18 may have a body 30, for example, a cylindrical body having a peripheral edge (periphery) 32, and at least one cutting element 34. The cutting element(s) 34 are located along the periphery 32 of the body 30. In one embodiment, the cutting element 34 is removably affixed to the body 30 via conventional locking mechanism 36, but the cutting element 34 may be permanently affixed to the body 30 of the cutting head 18.

The cutting angle (also known as the rake angle) may be a negative, neutral, or positive cutting angle. In one embodiment, the cutting angle is a negative cutting angle. The negative cutting angle (or negative rake angle) may be any negative angle. The negative cutting angle is used to stabilize the cut. In one embodiment, the cutting angle is in the range of 0° to −20°. In another embodiment, the cutting angle is in the range of −10° to −1°. In yet another embodiment, the cutting angle is in the range of −7° to −3°. In yet another embodiment, the cutting angle may be −5°.

The cutting element 34 may be any cutting element. Cutting elements are commercially available and come in various shapes and are made from various materials. In an embodiment, the cutting element may be any cutting element with an angle of less than 90°. In one embodiment, the cutting element may be rhombus-shaped. The angle of the rhombus may be any angle; in some embodiments the angle may be 30° or 55°. In another embodiment, the cutting element 34 may be those designated as D or V (rhombus-shaped with 55° and 30° angle, respectively). In yet another embodiment, the cutting element 34 may be designated as DN or VN (the N refers to a negative cutting angle). The cutter element 34 may be made of any material. In one embodiment, the cutting element 34 any material, although carbon based materials, i.e., diamonds, are less preferred. In another embodiment, the cutter element 34 may be made of poly cubic boron nitride (PCBN). In yet another embodiment, the cutting element 34 may have a hardness at least 20 points greater, on a Rockwell scale, than the material being cut.

The computer 20 is used to control the movement of the disk 22 (work piece) about the cutting head 18 and raise and lower the cutting head 18 relative to the work piece. The computer 20 may be any computer capable of controlling the movement of the table 12, the digital indexer 16, the cutting head 18, and, optionally, the angle plate 14. In one embodiment, the computer 20 is computerized numerical controller (or CNC). The computer is programmable, so that after programming and set up, the computer can be used to repeat the steps of the sharpening operation. Programming is conventional and within the skill of the art.

The operation of the machine 10 is illustrated in FIGS. 4A-4E.

Figure 4A:
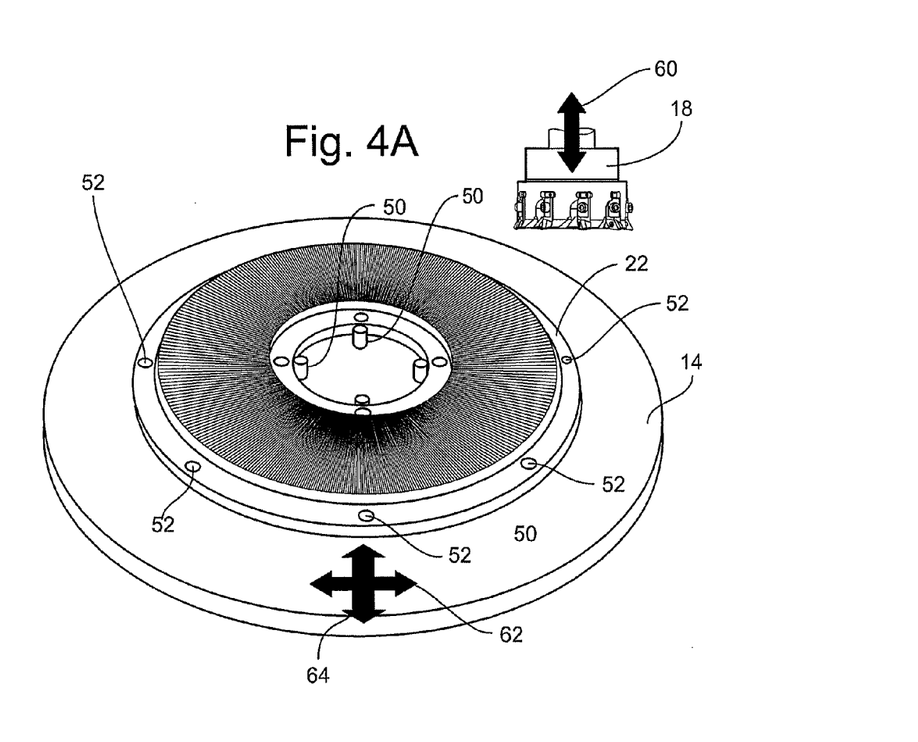
FIGS. 4A-4E illustrate the relative position of the disk in relationship to the cutting head during various steps of the inventive process.

FIG. 4A illustrates cutter head 18 positioned above angle plate 14 and disk 22. Disk 22 is affixed to angle plate 14 using, for example, a plurality of set pins 50 and set screws 52. The cutter head is movable in the z (vertical) direction 60. The disk 22 is movable in the x-y plane 62/64. The table 12 (not shown) is moved away (in the figure to the left) from the cutter head 18, so that the work piece 22 may be affixed to the angle plate 14.

Figure 4B:
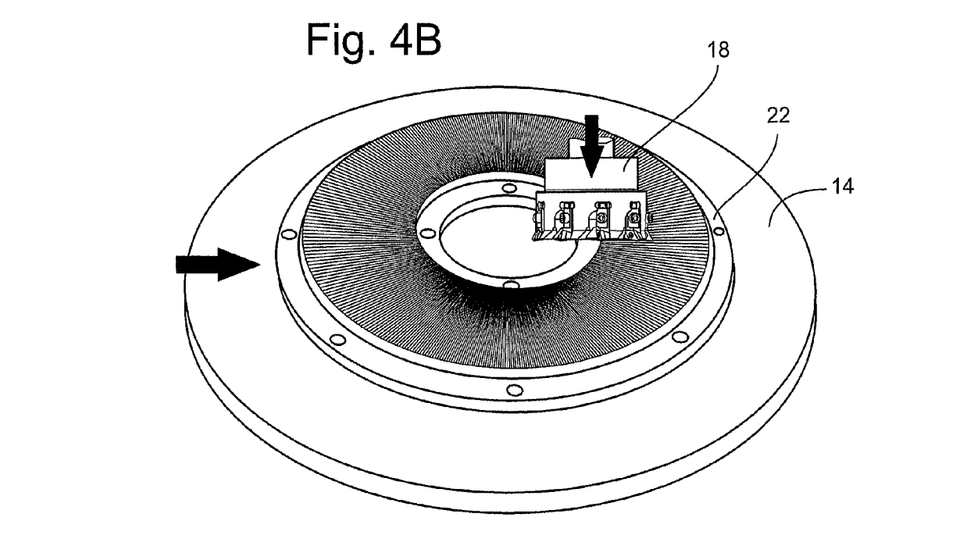

FIG. 4B illustrates the zeroing (or initializing) operation. In this operation, the cutter head is positioned relative to the tooth of the disk 22 to be sharpened. This information is input into the computer 20, so that the computer 20 knows the relative position of the cutter head 18 to the work piece 22. For this zero position, the subsequent movement of the work piece 22 and the cutter head 18 are guided through the sharpening operation. From the position shown in FIG. 4A, the work piece 22 is moved to the right and the cutter head 18 is moved down.

Figure 4C:
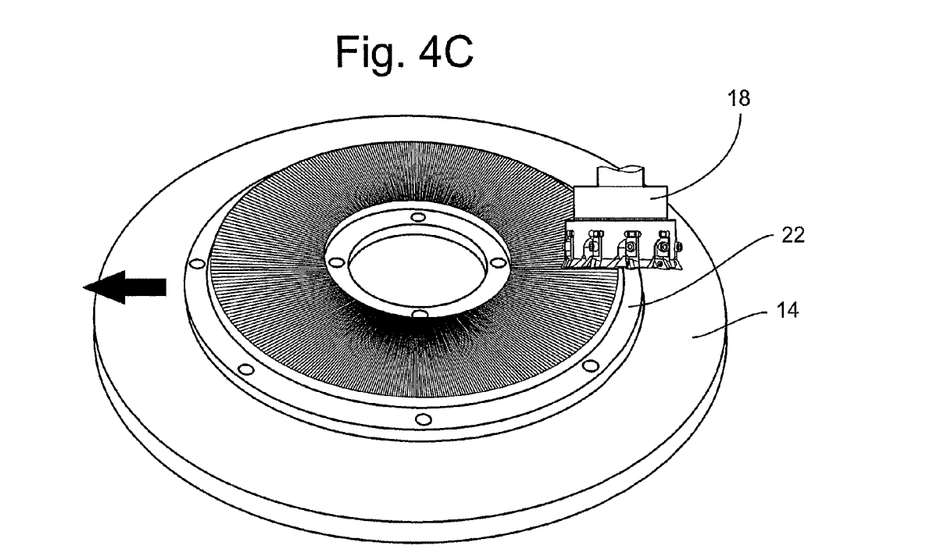

FIG. 4C illustrates the sharpening (or cutting) operation. After zeroing, the cutter head 18 begins rotation and the work piece 22 is moved (to the left) by operation of the table 12 (not shown). The movement of the cutting head across the surface of the tooth may be at a rate, for example, greater than or equal to 100 inches/minute.

Figure 4D:
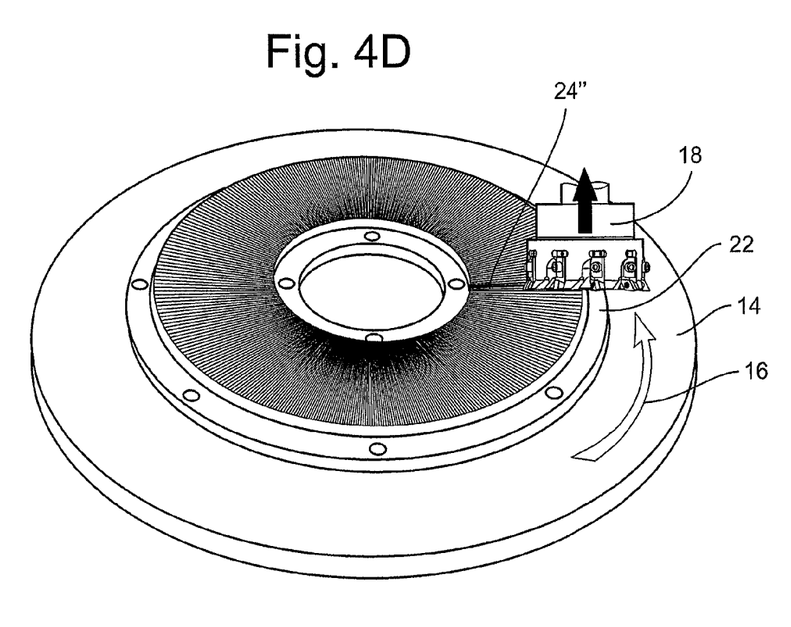

FIG. 4D illustrates the completion of the sharpening of one tooth 24'. After the cutting head has made on complete pass over the tooth, the cutting head 18 is lifted from the work piece 18 and the work piece is indexed (arrow 66) to the next tooth.

Figure 4E:
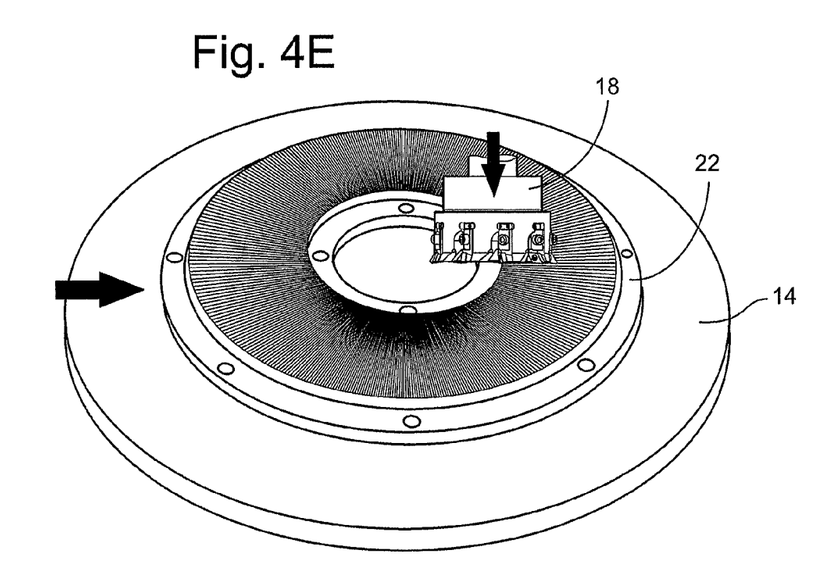

FIG. 4E, similar to FIG. 4B, shows that after the completion of the sharpening of one tooth, the work piece 22 is moved (to the right) and the cutter head 18 is moved down, so that the next tooth may be sharpened.

The foregoing series of steps is repeated until all the teeth have been sharpened. By using the foregoing method, sharpening time may be reduced to about 45-60 minutes, and only one pass per tooth is needed. Further, the method may be accomplished without the use of coolant.

Figure 5A:
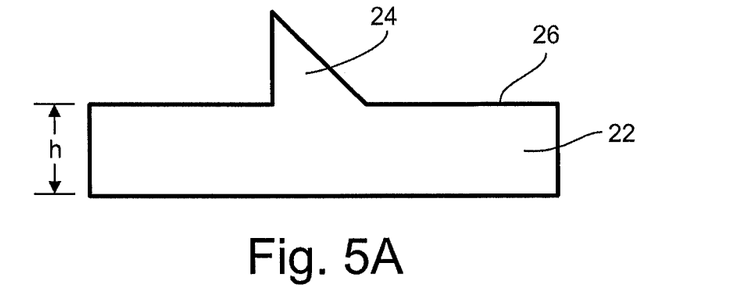
FIGS. 5A-5C illustrate the cycle of sharpening from a new sharpened disk (FIG. 5A) to a dulled tooth (FIG. 5B) to a sharpened tooth (FIG. 5C).
Figure 5B:
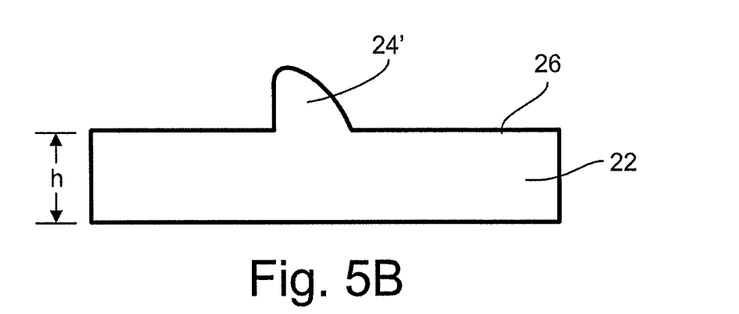
Figure 5C:
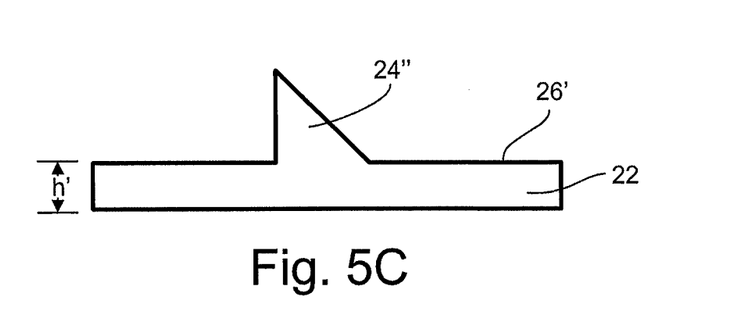

FIGS. 5A-5C illustrate the impact of the sharpening operation on the disk 22. In FIG. 5A, a new (or newly sharpened) disk 22 with a single tooth 24 standing on the disk's surface 26. The height h of the disk is shown. FIG. 5B illustrates a worn tooth 24' in need of sharpening, Note that some of the surfaces of the tooth are rounded with wear, but the height h of the disk remains the same as shown in FIG. 5A. FIG. 5C shows a freshly sharpened disk 22. Note that the height h' is shorter than h in FIG. 5A. During the sharpening operation, metal is cut away from the disk, whereby the thickness of the disk is reduced (i.e., h>h'). The disk, thus, may only be sharpened a finite number of times. The number of times for sharpening depends, among other things, on the thickness of the disk and the amount of material cut from the disk during sharpening.

The present invention may be embodied in other forms without departing from the spirit and the essential attributes thereof, and, accordingly, reference should be made to the appended claims, rather than to the foregoing specification, as indicating the scope of the invention.

I claim:

1. A method for sharpening teeth on a pulverizer or powder mill disk, the teeth being worn down from an original triangular shape and size, the triangular teeth radially extending and standing axially up on a planar disk surface which is perpendicular to an axis of the disk, the planar disk having an original height measured along the axis of the disk, comprising the steps of:
   a) sharpening a worn tooth surface, sharpening being milling the tooth surface back to its original triangular shape and size by moving the disk having radially extending teeth standing up on the surface thereof relative to a cutting head, the milling of the tooth back to its original triangular shape also causing the cutting head to cut into the disk surface such that the height of the planar disk surface is reduced as the triangular tooth is milled back to its original shape and size, the milling of the worn tooth back to its original size and shape taking place in only one pass of the cutter head;
   b) separating the disk from the cutting head;
   c) indexing the disk to the next worn tooth for sharpening;
   d) engaging the cutting head with the next worn tooth for sharpening; and repeating steps a)-d) until sharpening of all of the worn teeth is complete.

2. The method of claim 1 further comprising the steps of: mounting the disk at an angle to a cutting head, and zeroing the cutting head to a first tooth before the initiation of steps a)-d).

3. The method of claim 1 wherein the cutting head comprises a rotary head having at least one cutting element affixed at a periphery of the head and being adapted to mill a tooth face of the disk.

4. The method of claim 3 wherein the cutting element mills the tooth face of the disk at a negative cutting angle.

5. The method of claim 3 wherein the cutting element being classified with a D or V designation.

6. The method of claim 3 wherein the negative cutting angle being in a range of −20° to 0°.

7. The method of claim 2 wherein the angle being in the range of 0°-90°.

8. The method of claim 1 wherein the milling of the tooth surface by moving the disk having radially extending teeth standing up on the surface thereof relative to a cutting head at a rate of greater than or equal to 100 inches/minute.

* * * * *